United States Patent

Wafer

Patent Number: 5,732,731
Date of Patent: Mar. 31, 1998

[54] SECONDARY SEAL BYPASS VALVE FOR GATE VALVES

[75] Inventor: Don B. Wafer, Spring, Tex.

[73] Assignee: FMC Corporation, Chicago, Ill.

[21] Appl. No.: 719,505

[22] Filed: Sep. 24, 1996

[51] Int. Cl.$^6$ .................. F16K 41/04; F16K 43/00; F16K 41/14; F16J 15/20

[52] U.S. Cl. .................. 137/312; 137/315; 251/214; 251/330; 277/59; 277/69; 277/110; 277/124

[58] Field of Search .................. 137/312, 315; 251/214, 326, 327, 328, 329, 330, 267; 277/59, 68, 69, 110, 112, 123, 124, 125

[56] References Cited

U.S. PATENT DOCUMENTS

| | | | |
|---|---|---|---|
| 2,780,233 | 2/1957 | Volpin | 251/330 |
| 3,990,679 | 11/1976 | Boitnott | 251/214 |
| 4,149,558 | 4/1979 | McGee et al. | 251/214 |
| 4,245,661 | 1/1981 | McGee | 251/330 |
| 4,289,157 | 9/1981 | McGee | 251/330 |
| 4,307,745 | 12/1981 | McGee | 251/214 |
| 4,364,542 | 12/1982 | Meyer | 251/214 |
| 4,379,557 | 4/1983 | Saka | 251/214 |
| 4,886,241 | 12/1989 | Davis et al. | 251/214 |
| 4,972,867 | 11/1990 | Ruesch | 251/214 |
| 5,062,439 | 11/1991 | Butler et al. | 251/214 |
| 5,078,175 | 1/1992 | Martin et al. | 251/214 |
| 5,129,624 | 7/1992 | Icenhower et al. | 251/214 |
| 5,203,370 | 4/1993 | Block et al. | 251/214 |
| 5,221,063 | 6/1993 | Wafer et al. | 251/330 |
| 5,244,183 | 9/1993 | Calvin et al. | 251/214 |
| 5,263,682 | 11/1993 | Covert et al. | 251/214 |
| 5,312,087 | 5/1994 | Jones | 251/214 |
| 5,476,117 | 12/1995 | Pakula | 251/214 |

*Primary Examiner*—George L. Walton
*Attorney, Agent, or Firm*—Henry C. Query, Jr.

[57] ABSTRACT

In combination with a gate valve comprising a valve body having an internal cavity extending between an inlet port and an outlet port, a bonnet mounted to the valve body and having an internal passageway in communication with the cavity, a valve stem rotationally supported in the passageway, a handle connected to one end of the valve stem and a gate threadedly connected to the other end of the valve stem, the improvement comprising a first packing for sealing between the bonnet and the valve stem to prevent pressure within the cavity from escaping through the passageway, a second packing for sealing between the bonnet and the valve stem to prevent pressure within the cavity from escaping through the passageway, the second packing being located between the first packing and the cavity, a bypass port extending between a first portion of the passageway below the second packing and a second portion of the passageway above the second packing, and a bypass valve for selectively closing the bypass port such that the first packing contains the pressure when the bypass port is open and the second packing contains the pressure when the bypass port is closed.

3 Claims, 2 Drawing Sheets

SECONDARY SEAL BYPASS VALVE FOR GATE VALVES

BACKGROUND OF THE INVENTION

1. Field of the Invention

The present invention relates to gate valves having a valve body, a stem rotationally supported in a bonnet attached to the valve body and inboard and outboard packings for sealing between the stem and the bonnet to prevent pressurized fluid within the valve body from escaping through the bonnet. More particularly, the invention is directed to a bypass valve which when open allows the fluid to bypass the inboard packing and be contained solely by the outboard packing and when closed allows the fluid to be contained solely by the inboard packing.

2. Description of Related Art

Prior art gate valves typically comprise a valve body having an internal flow passage extending between an inlet port and an outlet port, a bonnet mounted to the valve body, a valve stem rotationally supported in the bonnet, a handle connected to one end of the valve stem and a gate threadedly connected to the other end of the valve stem such that, when the valve stem is rotated via the handle, the gate will raise or lower to open or close the flow passage. In order to prevent pressurized fluid or gas from leaking out of the valve body through the bonnet, an annular packing is positioned around the valve stem to seal between the valve stem and the bonnet.

If the packing develops a leak, then it will need to be replaced. However, because of its location in the bonnet, the packing is relatively difficult to replace. Also, in order to ensure that the pressurized fluid or gas does not leak out of the bonnet while the packing is being replaced, backseating techniques must usually be employed to seal off the bonnet from the valve body.

SUMMARY OF THE INVENTION

In accordance with the present invention, these and other problems are alleviated by providing a gate valve comprising a valve body having an internal flow passage extending between an inlet port and an outlet port, a bonnet mounted to the valve body, a valve stem rotationally supported in the bonnet, a handle connected to one end of the valve stem and a gate threadedly connected to the other end of the valve stem such that, when the valve stem is rotated via the handle, the gate will raise or lower to open or close the flow passage. The gate valve is also provided with an outboard packing positioned around the valve stem, an inboard packing positioned around the valve stem between the outboard packing and the valve body, a bypass port formed in the bonnet for communicating the pressurized fluid past the inboard packing to the outboard packing, and a bypass valve for selectively opening or closing the bypass port. When the bypass valve is open, the pressure across the inboard packing is equalized and the outboard packing becomes the primary seal between the valve stem and the bonnet. When the bypass valve is closed, the outboard packing is isolated from the pressurized fluid and the inboard packing becomes the primary seal.

In normal operation of the gate valve according to the present invention, the bypass valve is opened to permit the outboard packing to function as the primary seal between the valve stem and the bonnet. When the outboard packing develops a leak, the bypass valve is closed and the inboard packing becomes the primary seal. If desired, the gate valve can continue to be operated with the inboard packing functioning as the primary seal. Alternatively, the outboard packing may be replaced, which is a relatively simple operation because of the location of the outboard packing. During replacement, the inboard packing prevents pressurized fluid from leaking out of the valve body without the need to backseat the valve.

These and other advantages of the present invention will be made apparent by the following detailed description, with reference to the accompanying drawings.

DETAILED DESCRIPTION OF THE PREFERRED EMBODIMENTS

Figure 1:
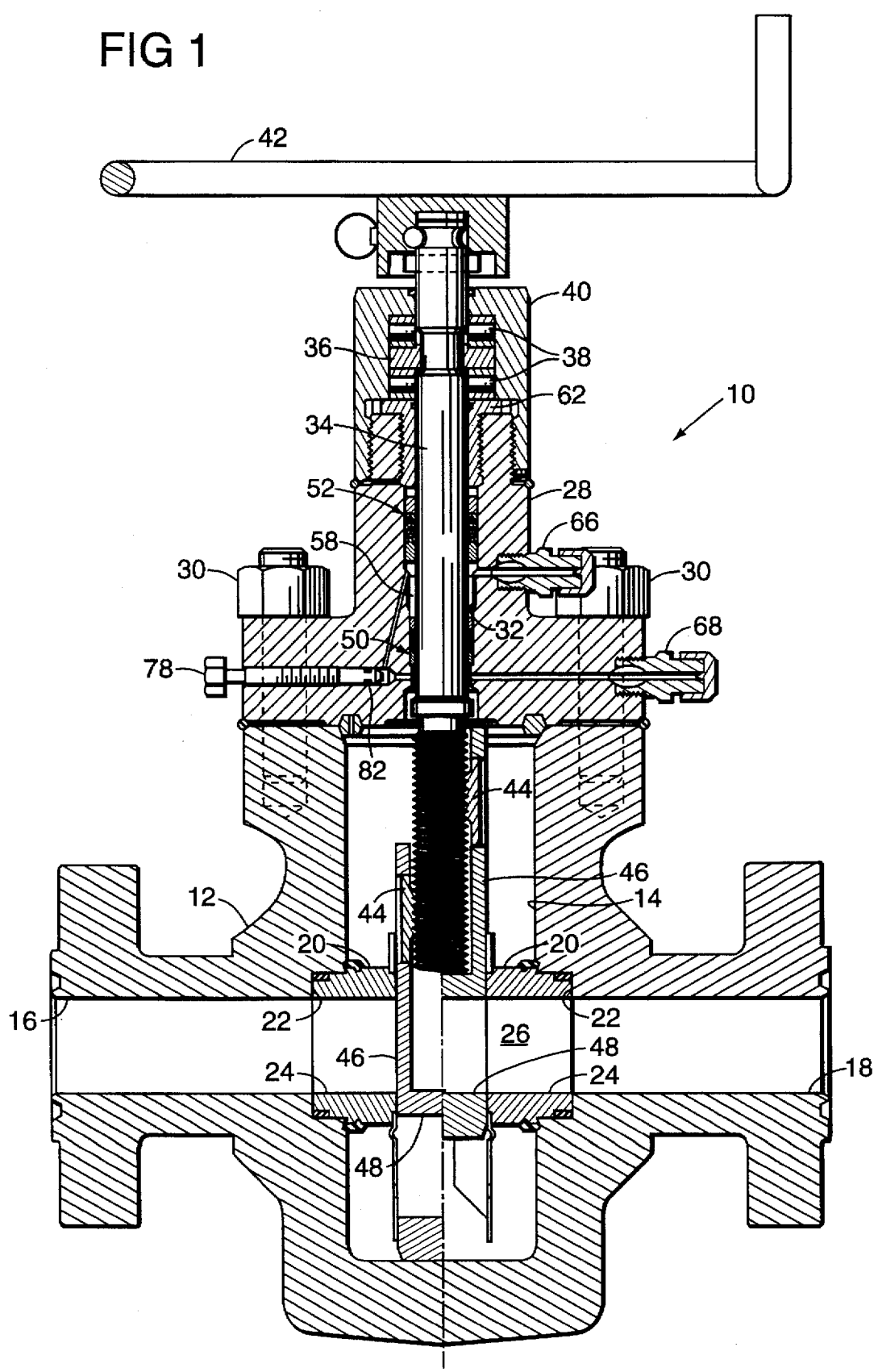
FIG. 1 is a cross-sectional view of the gate valve of the present invention.

Referring to FIG. 1, the gate valve of the present invention, indicated generally by reference number 10, is shown to comprise a valve body 12 having an internal cavity 14 extending between an inlet 16 and an outlet 18. Two valve seats 20 are mounted in corresponding grooves 22 formed in cavity 14, and valve seats 20 include through ports 24 which define a flow passage 26 between inlet 16 and outlet 18. Gate valve 10 further comprises a bonnet 28 connected to the valve body 12 by a number of bolts 30. Bonnet 28 includes an internal passageway 32 which communicates with cavity 14 and through which extends a valve stem 34. Valve stem 34 includes a thrust collar 36 which is rotationally supported in a set of bearings 38 which are secured to bonnet 28 by a bearing cap 40. An end of valve stem 34 extending beyond bearing cap 40 is connected to a handle 42, and the opposite end of valve stem 34 threadedly engages a lift nut 44 retained within a gate 46. Gate 46 includes an opening 48 which, when aligned with through ports 24 in valve seats 20, allows fluid to flow through passage 26. Thus, when valve stem 34 is rotated via handle 42, lift nut 44 and, consequently, gate 46 will be raised or lowered to either open or close flow passage 26, as depicted respectively in the right and left hand sides of FIG. 1.

Figure 2:
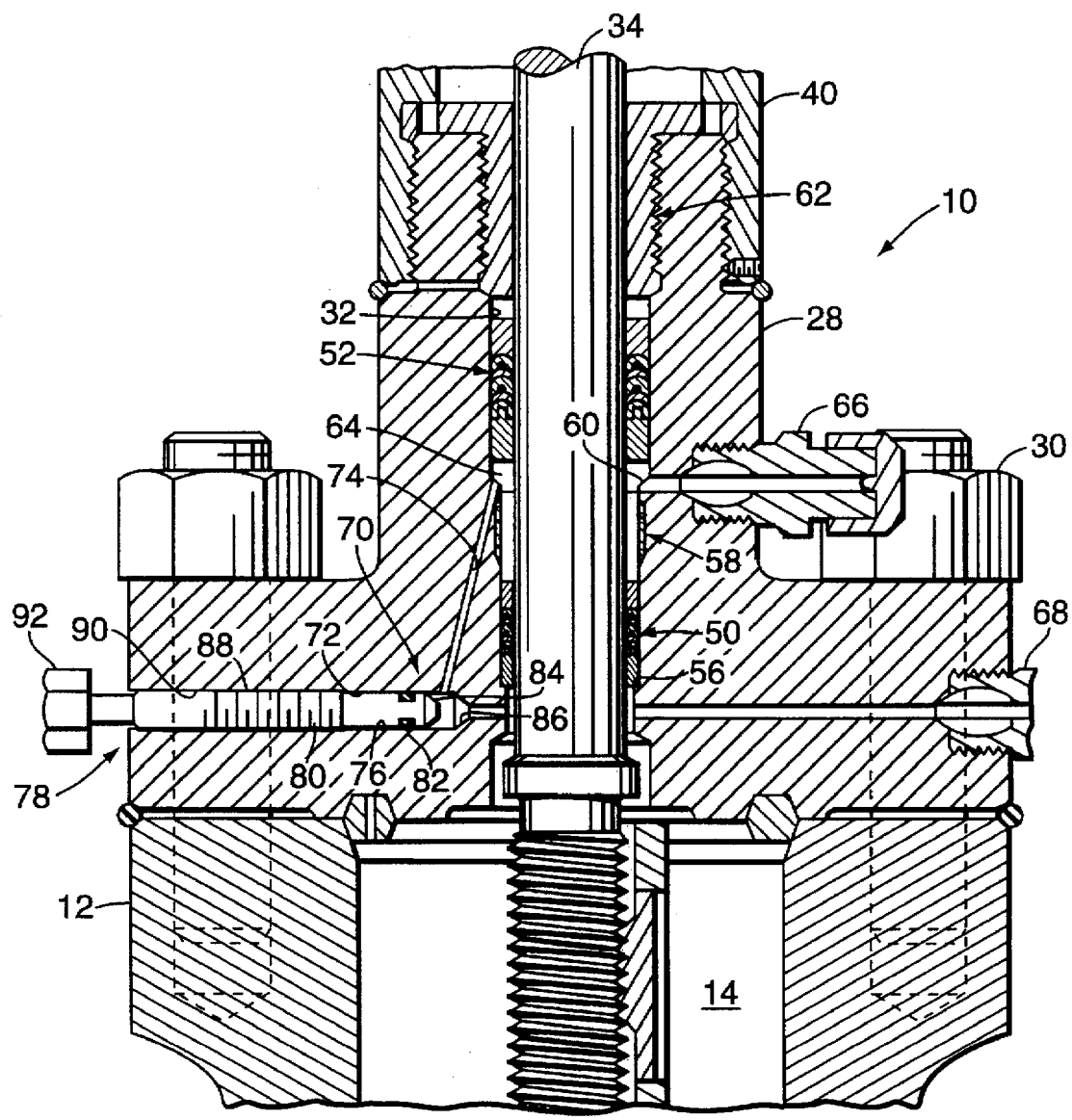
FIG. 2 is an enlargement of a portion of the gate valve shown in FIG. 1.

As just described, cavity 14 of valve body 12 is in communication with internal passageway 32 of bonnet 28. Thus, to prevent pressurized fluid within cavity 14 from leaking out of gate valve 10 through bonnet 28, an inboard packing 50 and an outboard packing 52 are provided to seal between internal passageway 32 and valve stem 34. Referring to FIG. 2, inboard and outboard packings 50, 52 can be any of a number of known annular seals, such as the UV-type stem packing disclosed in U.S. Pat. No. 4,576,385, which is owned by the assignee hereof. Inboard packing 50 is retained against an annular lower shoulder 56 formed in internal passageway 32 by a conventional inboard packing gland 58, which is restrained from axial movement within passageway 32 by any conventional means. Similarly, outboard packing 52 is retained above an annular upper shoulder 60 by a conventional outboard packing gland 62, which is held in place within passageway 32 by bearing cap 40. Lower and upper shoulders 56, 60 are spaced such that an annular void 64 exists between inboard and outboard packings 50, 52. Gate valve 10 may also be provided with conventional test ports 66, 68 for testing the integrity of packings 50, 52.

According to the present invention, gate valve 10 also comprises a bypass port 70 formed in bonnet 28 and extending between annular void 64 and the portion of passageway 32 below inboard packing 50. In the preferred embodiment of the invention, bypass port 70 includes a first drilled hole 72 extending from the portion of passageway 32 below inboard packing 50 to the exterior of bonnet 28 and a second drilled hole 74 extending between the first hole 72 and annular void 64 above inboard packing 50. First hole 72 comprises an enlarged diameter portion 76 which is adapted to receive a bypass valve 78. Bypass valve 78 includes a closure member 80 which carries an annular seal 82 for sealing between closure member 80 and first hole 72. In addition, closure member 80 preferably comprises a conical end 84 which is adapted to engage a beveled shoulder 86 formed in first hole 72 to form a fluid-tight seal between first hole 72 and second hole 74. However, the fluid-tight seal between first hole 72 and second hole 74 could be formed solely by annular seal 82, once it is positioned between these two holes. Closure member 80 is also provided with threads 88, which engage corresponding threads 90 in enlarged diameter portion 76 of first hole 72, and a head 92 which is adapted to be engaged by a wrench or similar means for turning closure member 80 to advance end 84 into engagement with shoulder 74, thereby closing off bypass port 70. Of course, other suitable means may be provided to advance closure member 80 within first hole 72, and means may also be provided to lock closure member 80 in position.

During normal operation of gate valve 10 according to the present invention, bypass valve 78 is left open to allow pressurized fluid to pass through bypass port 70 from below inboard packing 50 to the void 64 above inboard packing 50. In this condition, outboard packing 52 operates as the primary seal to prevent the fluid from escaping gate valve 10 through internal passageway 32 of bonnet 28. In addition, the pressure is balanced above and below inboard packing 50 to, in effect, preserve inboard packing 50 in an unused condition. If during operation of gate valve 10 a leak in outboard packing 52 is detected, then bypass valve 78 is actuated to close bypass port 70, which in turn seals off the pressurized fluid below inboard packing 50, and the pressure above inboard packing 50 is bled off through test port 66. In this condition, inboard packing 50 operates as the primary seal to prevent the fluid from escaping gate valve 10 through bonnet 28, and the valve can continue in operation. However, if it is desired to replace outboard packing 52, this can be done without having to backseat the valve since the inboard packing 50 will contain the pressurized fluid.

It should be recognized that, while the present invention has been described in relation to the preferred embodiments thereof, those skilled in the art may develop a wide variation of structural details without departing from the principles of the invention. Therefore, the appended claims are to be construed to cover all equivalents falling within the true scope and spirit of the invention.

What is claimed is:

1. In combination with a gate valve comprising a valve body having an internal cavity extending between an inlet port and an outlet port, a bonnet mounted to the valve body and having an internal passageway in communication with the cavity, a valve stem rotationally supported in the passageway, rotating means connected to one end of the valve stem and a gate threadedly connected to the other end of the valve stem, the improvement comprising:

first means for sealing between the bonnet and the valve stem to prevent pressure within the cavity from escaping through the passageway;

second means for sealing between the bonnet and the valve stem to prevent pressure within the cavity from escaping through the passageway, the second means being located between the first sealing means and the cavity;

a bypass port extending between a first portion of the passageway below the second sealing means and a second portion of the passageway above the second sealing means; and means for selectively closing the bypass port;

wherein pressure is communicated from the cavity to the second portion of the passageway when the bypass port is open and pressure is isolated from the second portion of the passageway when the bypass port is closed;

whereby the first sealing means contains the pressure when the bypass port is open and the second sealing means contains the pressure when the bypass port is closed.

2. The gate valve of claim 1, wherein the bypass port comprises a first hole extending through the bonnet from the first portion of the passageway to the exterior of the bonnet and a second hole extending through the bonnet from the first hole to the second portion of the passageway.

3. The gate valve of claim 2, wherein the closing means comprises a closure member adapted to be received in the first hole and means for sealing between the closure member and the first hole, wherein actuation of the closing means causes the closure member sealing means to seal off the first hole, thereby closing the bypass port.

* * * * *